June 8, 1971 J. PEONI 3,583,026
CLAM OPENER
Filed Jan. 10, 1969
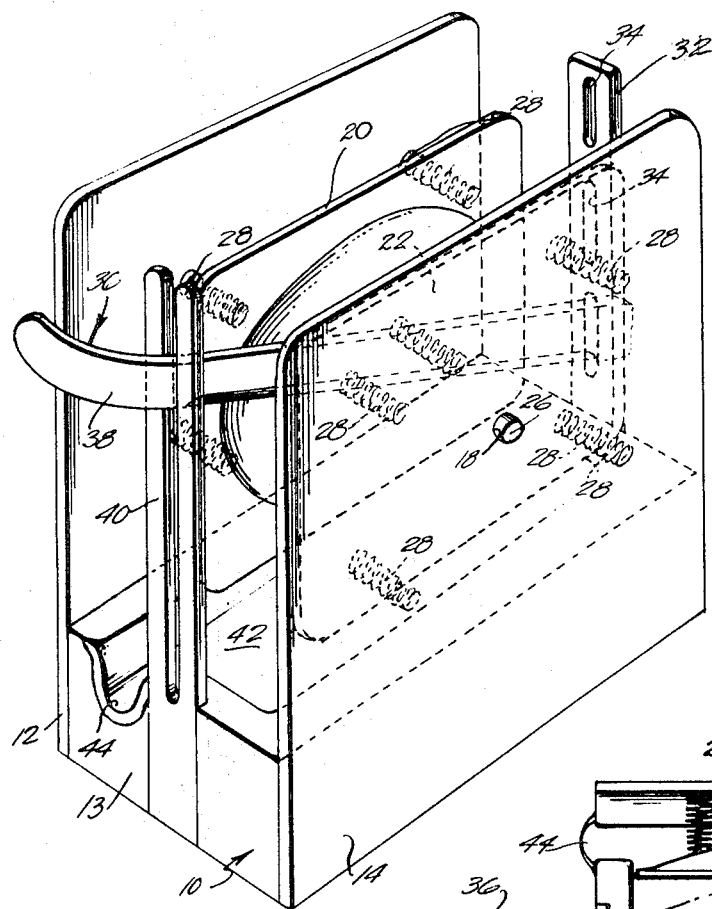
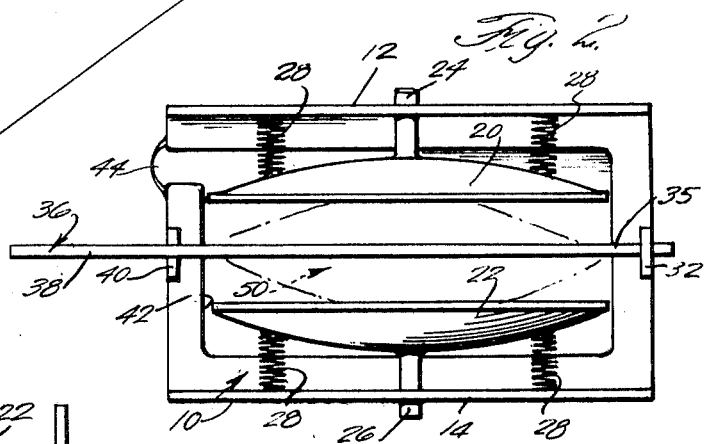
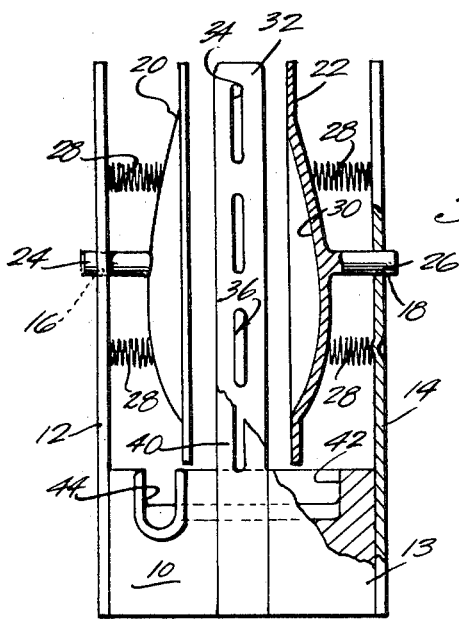
INVENTOR.
JOSEPH PEONI
BY Lloyd O. Bonsted
HIS ATTORNEY 3,583,026
CLAM OPENER
Joseph Peoni, 308 Rismar Drive,
Port St. Lucie, Fla. 33450
Filed Jan. 10, 1969, Ser. No. 790,339
Int. Cl. A22c 29/00
U.S. Cl. 17—76                          1 Claim

ABSTRACT OF THE DISCLOSURE

The invention consists of an upright open ended and open top box having side walls and spring-biased clam-holding plates fastened one each to a side wall for movement toward and away from the side wall. A clam is inserted between the plates and a knife fulcrumed by one end in a support is engageable with the seam of the clam to force the clam open.

The present invention relates to openers for shellfish and specifically to a device for opening clams.

An object of the present invention is to provide a clam opener which is simple in construction, one which is efficient in operation, and one which may be produced economically.

Another object of the present invention is to provide a clam opener which adapts itself for use in opening all sizes of clams.

A further object of the present invention is to provide a clam opener which may be used safely and without the usual danger of an exposed knife edge or point.

These and other objects will be apparent from the following description as construed in the single sheet of drawing in which:

FIG. 1 is a perspective view of the clam opener;
FIG. 2 is a top view; and
FIG. 3 is an elevational view of the front end, with portions broken away.

Referring in detail to the drawing, in which like numerals indicate like parts throughout the several views, the invention consists of a flat base 10 of rectangular shape and adapted to be supported on a table or the like. The base 10 has a rearward end 11 and a forward end 13. Rising from opposed sides of the base 10 are walls 12 and 14, each being provided centrally thereof with a hole, as at 16 and 18 respectively. A holding plate 20 is loosely mounted inwardly of and adjacent the wall 12 and another similarly formed plate 22 is similarly positioned with respect to the wall 14. Guide pins 24 and 26 project outwardly from the plates 20 and 22, respectively, and are slidably received in the adjacent holes 16 and 18. Each plate 20 and 22 is biased by a set of four springs 28, spaced about the respective pins 24 and 26 and operate to force the adjacent plate 20 or 22 away from the attached and adjacent wall 12 or 14. Each plate 20 and 22 is provided with a concavity as at 30 in FIG. 3, with respect to the plate 20, the concaviites facing each other.

An upright post 32 rises from the rear end of the base 10 and is provided with a plurality of vertically spaced slots 34, each of which engageably receives the portion 35 adjacent one end of a knife 36 having a handle portion 38 slidably mounted in a slotted upright 40 rising from the front end of the base 10 for swinging upward and downward movement toward and away from the base 10. The base 10 has a hollowed out portion, as at 42, in its upper face for receiving the juices of a clam as it is opened, one end of the hollowed-out portion 42 having a pouring spout 44 so that the collected juice may be emptied from the base 10.

In use a clam 50, as indicated in dotted lines in FIG. 2, is positioned between the plates 20 and 22 and the knife 36 is adjusted in the appropriate slot 34, depending on the size of the clam and the knife 36 is pressed downwardly through the growing edges or seam of the clam to effect the opening thereof.

It will be seen therefore that the invention accomplishes the opening of clams or other bivalves without exposing the user's hands to injury.

It is intended that the structure defined may be cast of metal, formed of plastic, or assembled from wood parts, and while only a single embodiment of the invention has been shown and described other embodiments are contemplated within the scope of the appended claim.

I claim:
1. A clam opener comprising a base having opposed sides, a front end, a rear end, and an upper face,
   a wall rising from each of said sides of said base,
   each of said walls being provided with a hole,
   a holding plate disposed inwardly of and spaced from each of said walls, a guide pin attached to each of said plates and slideably engageable in the adjacent one of said holes, spring means operatively connecting each of said plates to the adjacent wall and biasing said plates toward each other,
   knife means having one end thereof operatively connected to said base for swinging movement toward and away from said base and disposed between said plates,
   said upper face of said base being provided with a hollowed-out portion for receiving clam juice from a clam when opened by said knife means, said hollowed-out portion of said base upper face extending to said base front end, and
   a pouring spout on said base front end connected in communication with said hollowed-out portion of said base upper face.

References Cited
UNITED STATES PATENTS

| 10,810 | 4/1854 | Towers | 17—76 |
| 2,506,817 | 5/1950 | Svec | 17—76 |
| 3,440,684 | 4/1969 | Coccellato | 17—76 |

LUCIE H. LAUDENSLAGER, Primary Examiner